(12) United States Patent
Korman

(10) Patent No.: US 8,355,498 B2
(45) Date of Patent: Jan. 15, 2013

(54) COMMUNICATION LINE INTERFACE

(75) Inventor: John J. Korman, Stony Brook, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1625 days.

(21) Appl. No.: 11/797,388

(22) Filed: May 3, 2007

(65) Prior Publication Data

US 2008/0273691 A1 Nov. 6, 2008

(51) Int. Cl.
*H04M 7/00* (2006.01)
(52) U.S. Cl. ........... 379/413.04; 379/90.01; 379/413.03; 379/442
(58) Field of Classification Search . 379/399.01–413.04
See application file for complete search history.

(56) References Cited

U.S. PATENT DOCUMENTS

| 6,483,902 | B1 * | 11/2002 | Stewart et al. | 379/90.01 |
| 6,788,786 | B1 * | 9/2004 | Kessler et al. | 379/413.04 |
| 2007/0286411 | A1 * | 12/2007 | King et al. | 379/442 |

* cited by examiner

*Primary Examiner* — Yuwen Pan
*Assistant Examiner* — Ibraham Sharifzada

(57) ABSTRACT

A communication cable interface having a plurality of interface input jacks, each interface input jack capable of receiving an input connector of a service provider communication cable. The interface has an interface output jack for outputting a plurality of service provider signals onto another communication cable and into a distribution panel for distribution of signals to cabling that has been run throughout a residence. The signals are combined from the interface input jacks onto the interface output jack in a one-to-one relationship among terminals of the respective jacks.

20 Claims, 7 Drawing Sheets

COMMUNICATION LINE INTERFACE

TECHNICAL FIELD

Communication capability is increasingly important in both commercial and residential buildings. In particular, there is competition to provide telecommunication and other services to multi-dwelling unit (MDU) buildings, especially high-rise and sprawling MDU buildings. Several companies compete to bring communication facilities such as FTTP (Fiber-to-the-Premises), POTS (Plain Old Telephone Service), coaxial cable, satellite, and others to MDU buildings to provide services such as voice, video, data and others.

Traditionally, service provider cables entered an MDU building by, for example, a basement through means of an entrance facility. These cables and associated equipment were often installed and terminated at a central location, such as a dedicated telecommunications room from which building distribution wires, often cables in building distribution conduits, distributed the service to customers in living units throughout the building. Service provider personnel thus are required to access both the dedicated telecommunications room and the customer living unit in order to install the wiring required to provide service to the customer.

Once service was extended up to a living unit by building distribution wiring, service provider personnel would distribute service within the living unit by installing inside wiring or by accessing already existing wiring. Pre-positioning living unit inside wiring to allow multiple service providers gives the building owner and developer an added market value.

The building owner or developer may choose to provide access to this inside wiring through means of a single modular jack on a unit distribution panel in the living unit that distributes up to four communication services throughout the living unit. The customer then allows a single service provider personnel to connect service to the unit distribution panel jack.

Multiple service providers compete to provide telecommunication service. Moreover, customers often desire a multiplicity of services to be accessible at service outlets. However, this was often not possible with systems and methods of the prior art. Thus, there is a need for systems and methods to allow multiple service providers to access living unit inside wiring in MDU buildings.

It is to be understood that the following detailed description is exemplary and explanatory only and is not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
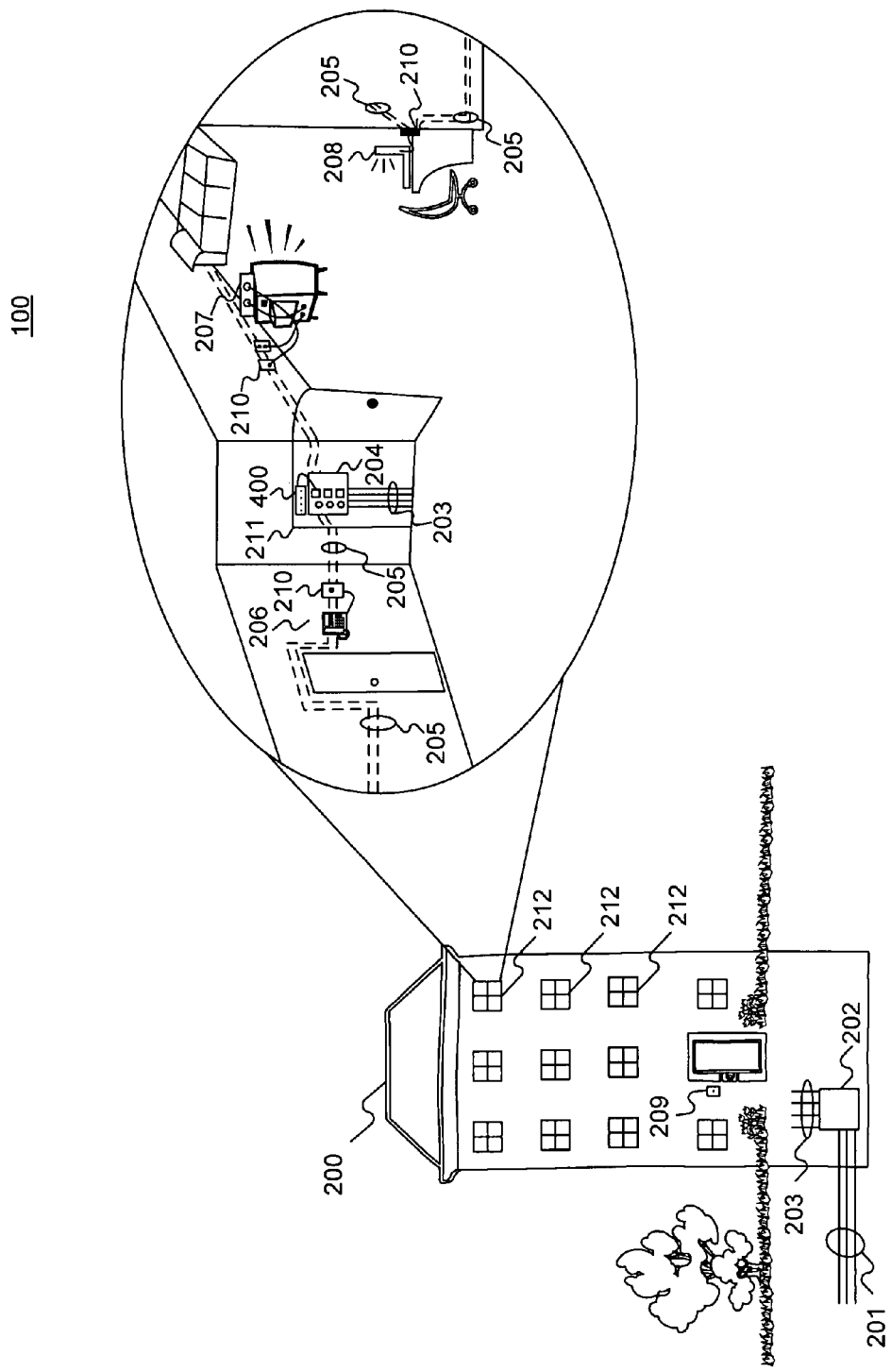
FIG. 1 is an example of a MDU building system.

FIG. 1 shows an exemplary system 100 to enable service provider access to pre-installed living unit inside wiring, such as unit distribution wiring 205 of living units 212 of a MDU building 200. Telecommunication service providers may deliver various services to the building by copper wire, fiber optics, satellite, free space optics or other transmission capabilities, as represented by cables 201 in FIG. 1. Cables 201 enter building 200 through the basement. A building distribution panel 202 terminates cables 201 and routes signals to individual living units 212 in building 200 via distribution wiring, such as building distribution wiring 203. Some buildings also route doorbell 209 or concierge services to building distribution panel 202 for distribution to living units 212 via distribution wiring. Distribution wiring can enter an individual living unit 212 and can be directly routed throughout the living unit or, as shown in FIG. 1, building distribution wiring 203 can be routed to a unit distribution panel 204 in a service closet 211. Signals from building distribution wiring 203 are coupled via unit distribution panel 204 to unit distribution wiring 205. Unit distribution wiring 205 terminates at service outlets 210 installed at locations in the living unit such as a family room, bedroom, or office. The customer may then connect a device such as a computer 208, telephone 206, television 207, or router (not shown) to service outlet 210 to obtain service on that device.

Unit distribution wiring 205 may be provided in the form of shielded or unshielded cable such as twisted-pair, Category-3, Category-4, Category-5, etc. Typically, the cable of unit distribution wiring 205 is made up of multiple pairs of wires. Telecommunication services are typically provided using a single pair of wires, though some services, such as doorbell service, are capable of operation on only one wire of a cable.

Figure 2:
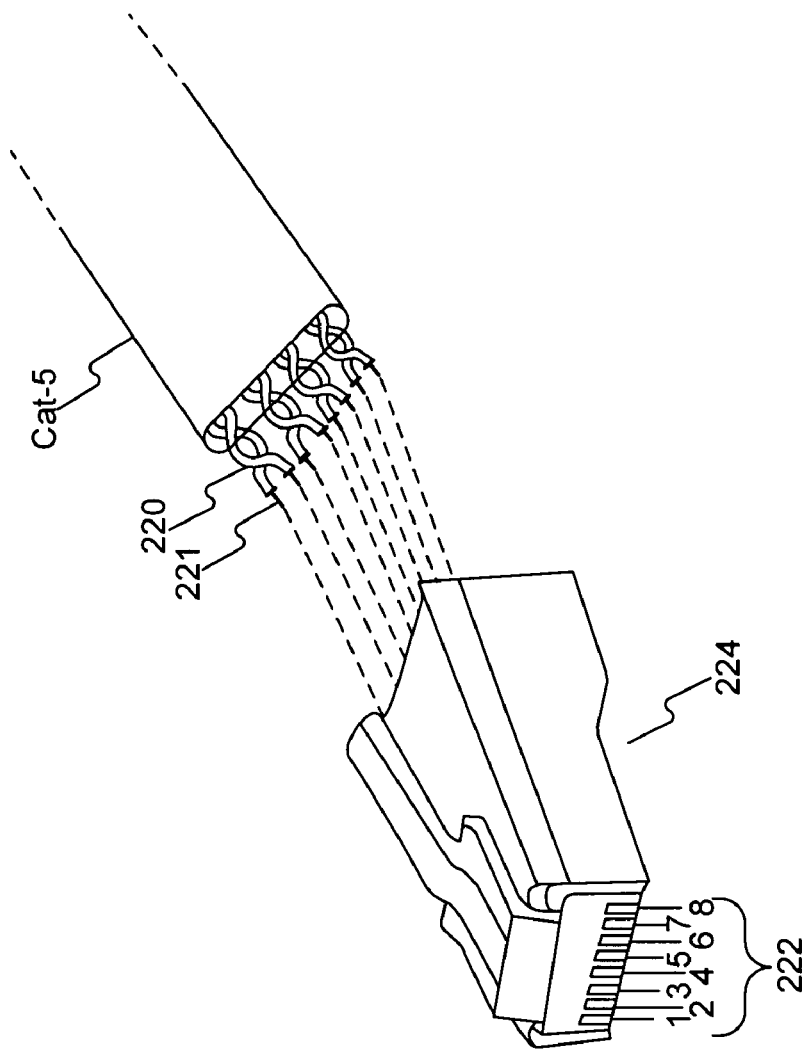
FIG. 2 is an example of a Category-5 cable termination to a RJ-45 type plug connector, shown as a break-away diagram.

Though many types of cable are available, an exemplary embodiment will be explained using Category-5 (Cat-5) type cable. FIG. 2 shows a break-away diagram of an exemplary Cat-5 cable termination to an RJ-45 (Registered Jack) type plug connector 224. Cat-5 cable has four pairs of wires 220 with ends 221 that electrically connect to eight respective connector terminals 222 of connector 224. Wires 220 are connected to the connector terminals 222 according to an industry-standard pattern such as 568A, 568B, or USOC, though a straight-line connection has been shown in FIG. 2. Many service providers use only the center two connector terminals 222 at positions 4 and 5 of the connector 224.

Figure 3:
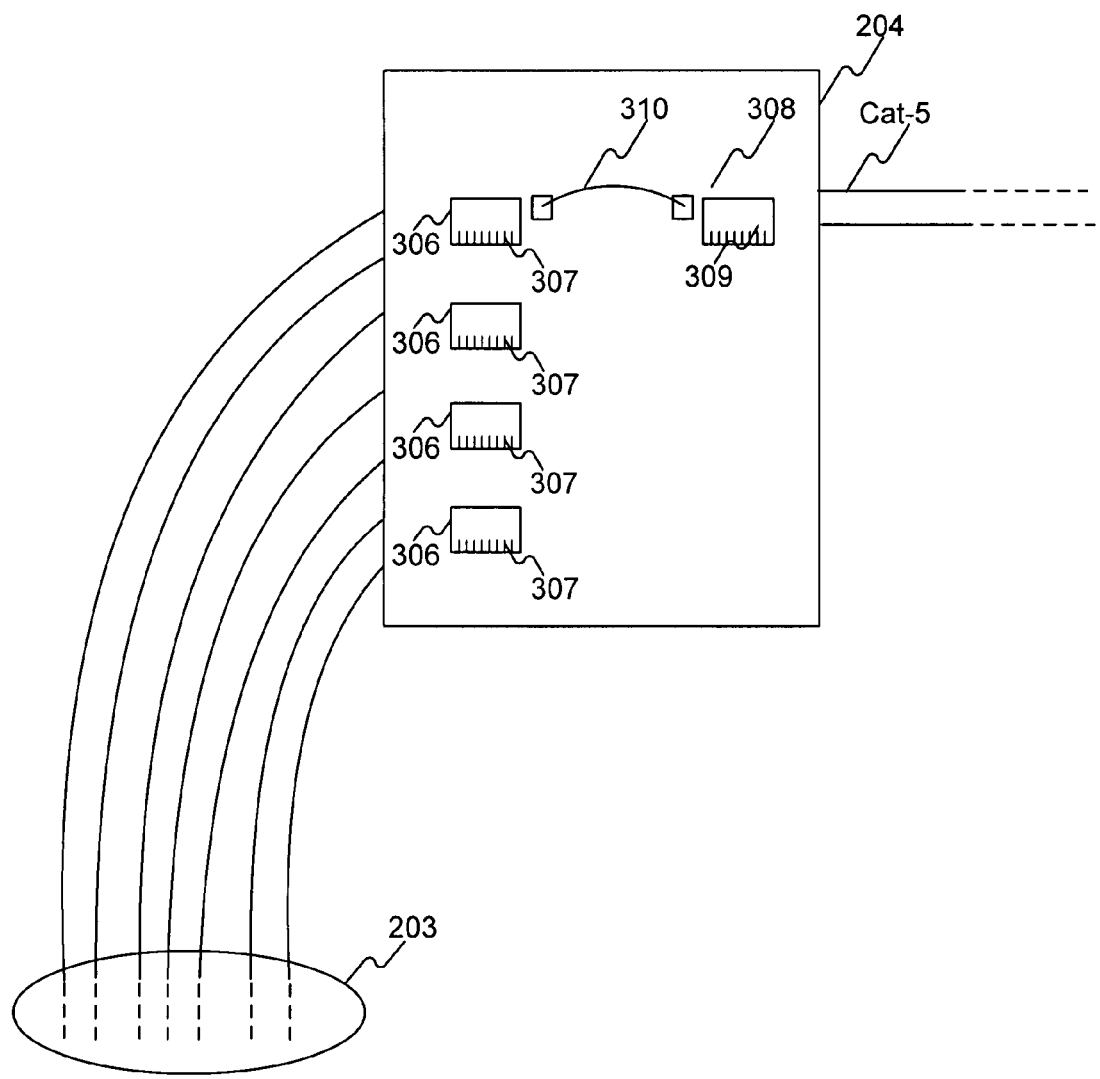
FIG. 3 is an example of a distribution panel

FIG. 3 shows a detailed view of a unit distribution panel 204. For clarity, many features have been omitted. Building distribution wiring 203 terminates at unit distribution panel 204. Unit distribution wiring 205 also terminates at the distribution panel 204. As an example, one cable of building distribution wiring 203 terminates to a service provider jack 306 having service provider terminals 307 electrically connected to individual wires of building distribution wiring 203. Though jack-type (ferrule) connectors have been illustrated on the unit distribution panel 204, some unit distribution panels 204 may employ plug (male) connectors, or both jack and plug connectors.

A jumper 310, shown schematically in FIG. 3, may be used to electrically connect service provider jack 306 to unit distribution jack 308 having unit distribution terminals 309 electrically connected to individual wires 220 of unit distribution wiring 205. It can be seen that unit distribution panel 204 may have multiple service provider jacks 306 for a single unit distribution jack 308.

As noted above, service providers often use only a single pair of wires by electrically connecting two wires of building distribution wiring 203 to the center two service provider terminals 307 of a service provider jack 306. With four service providers, as shown in FIG. 3, only eight wires are required. Unit distribution wiring 205 includes one Cat-5 cable, providing a total of eight wires 220, with the potential to deliver service from four service providers throughout living unit 212. However, the eight wires 220 of unit distribution wiring 205 terminate in one unit distribution jack 308. Thus, if a service provider uses a jumper 310 with RJ-45 connectors 224 to couple service provider signals to unit distribution jack 308, that service provider effectively blocks access to the remaining wires 220 of the Cat-5 cable of unit distribution wiring 205. Only one service provider may be connected at unit distribution panel 204, thereby leaving the remaining service providers with no way to gain access to living unit 212. This arrangement also leaves six wires of the eight wires 220 of unit distribution wiring 205 unused.

Figure 4:
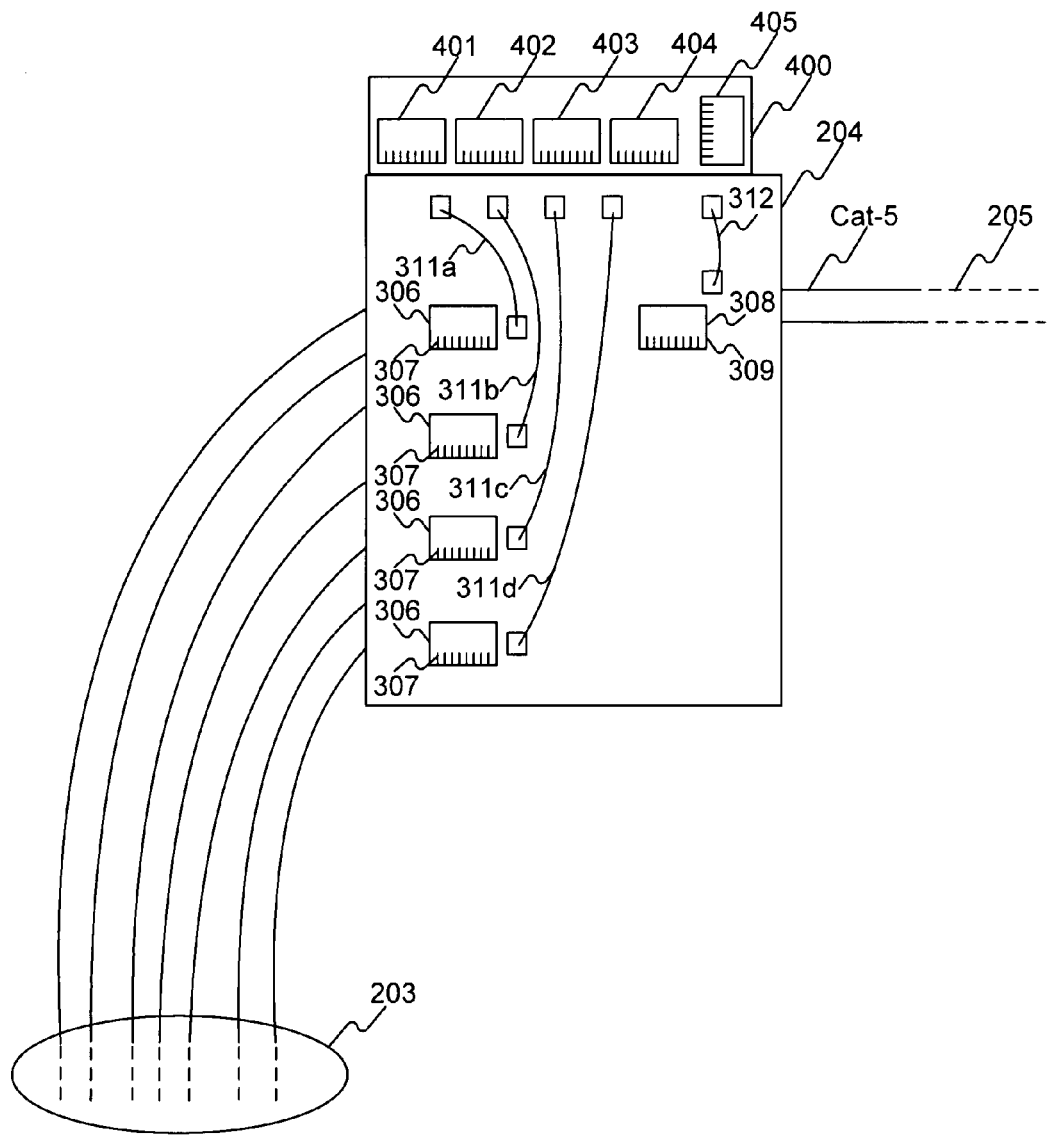
FIG. 4 is an example of a unit distribution panel and an interface.

FIG. 4 shows unit distribution panel 204 of FIG. 3 used with a communication line interface 400, according to an exemplary embodiment. As can be seen in FIG. 4, interface 400 includes a plurality of interface input connectors, such as RJ-45 jacks 401-404. Interface 400 also includes an interface output connector such as RJ-45 jack 405. Input jacks 401-404 are configured to receive corresponding cable input connectors of input cables, such as RJ-45 plugs attached to input jumpers 311a-311d coupled through service provider jacks 306 to cables of building distribution wiring 203. Interface output jack 405 is configured to receive a cable output connector such as an RJ-45 plug attached to an output jumper 312 coupled through unit distribution jack 308 to a cable of unit distribution wiring 205. Service provider signals are transferred from the building distribution wiring 203, through the service provider jacks 306, into the input jacks 401-404, across routing conductors, out interface output conductor 405 and back in to distribution panel 204 through unit distribution jack 308, and onto Cat-5 cable of unit distribution wiring 205 for distribution to outlets 210.

In one embodiment, interface 400 enables multiple service providers to connect to unit distribution panel 204 in a manner that can utilize all of the wires on unit distribution wiring 205. In this configuration, interface 400 accepts jumpers 311a-311d from four service provider jacks 306 of a unit distribution panel into interface input jacks 401, 402, 403, 404. Interface 400 provides electrical connection of the inputted service provider signals to terminals of an interface output jack 405 using routing conductors, which electrically connect interface input terminals to interface output terminals. The routing conductors may comprise discrete wires, printed circuit wiring or another type of conductor.

As an example, a living unit 212 can have a first telephone line Line 1 connected to a jack 306 of unit distribution panel 204 by a first service provider. The same service provider, or another, may provide a second telephone line Line 2 connected to a second jack 306. Another service provider could provide an additional service on Line 3 at another jack 306. The doorbell 209, concierge or yet another service provider could provide a service on Line 4 of a jack 306 on unit distribution panel 204. All four providers may then be, by jumpers 310, routed to respective interface input jacks 401-404 of the interface 400, through internal routing of the interface 400, to interface output jack 405. If the living unit 212 has only a single Cat-5 cable for unit distribution wiring 205, Line 1 through Line 4 could be occupied by telephone, data, doorbell, or any other services capable of interfacing with Line 1 through Line 4.

Figure 5A:
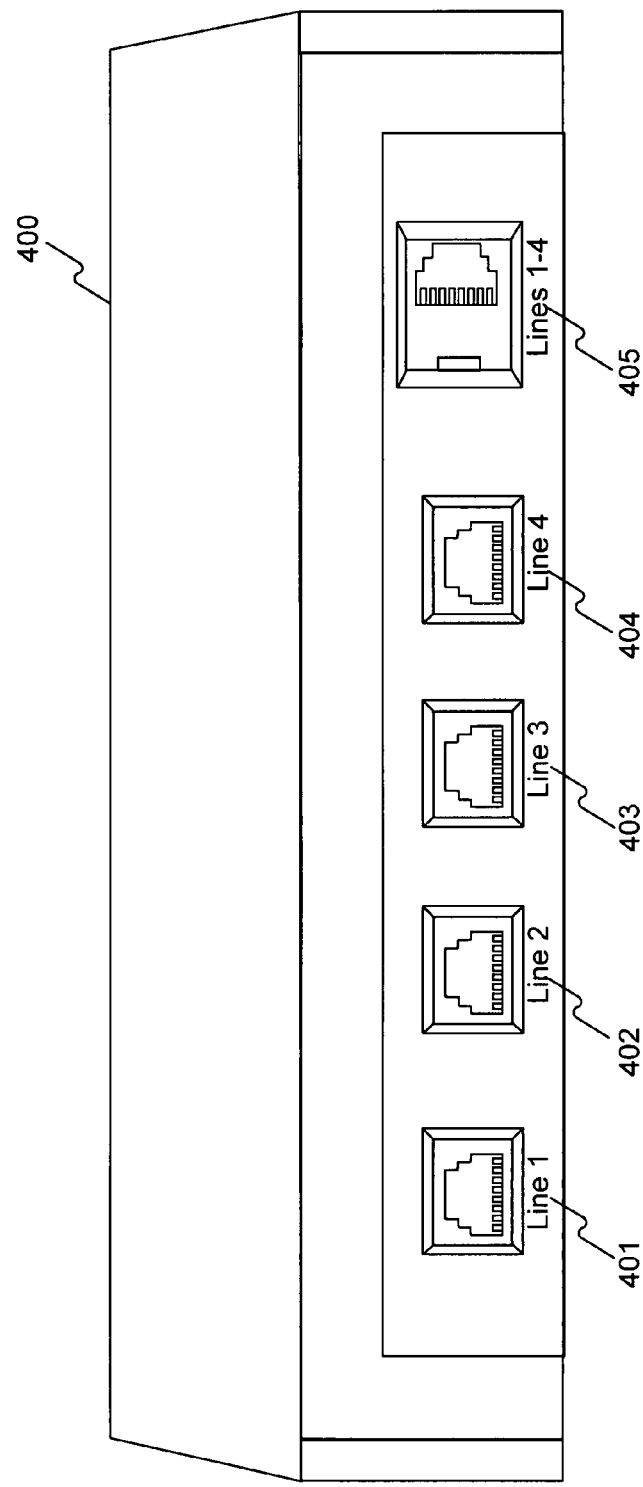
FIG. 5A is a pictorial view of an embodiment of an interface.

FIG. 5A shows a pictorial view of interface 400 using all RJ-45 type jacks. Other jack types can be substituted with their corresponding differences in terminal numbers. It is also possible to use jack type connectors that can receive more than one type of cable connector. In the exemplary embodiment of FIG. 5A, the RJ-45 jacks can receive either RJ-11 type plugs or RJ-45 type plugs. In an alternative embodiment, interface input jacks 401-404 can be RJ-11 type, and interface output jack 405 can be RJ-45 type. In another embodiment, instead of RJ-45 connectors, 8P8C type connectors can be used, which can have a corresponding change in wiring pattern at the connector terminals to 568A, 568B, or USOC. In other alternative embodiments, other numbers of interface input jacks can be used, as well as other numbers of actively used terminals.

Figure 5B:
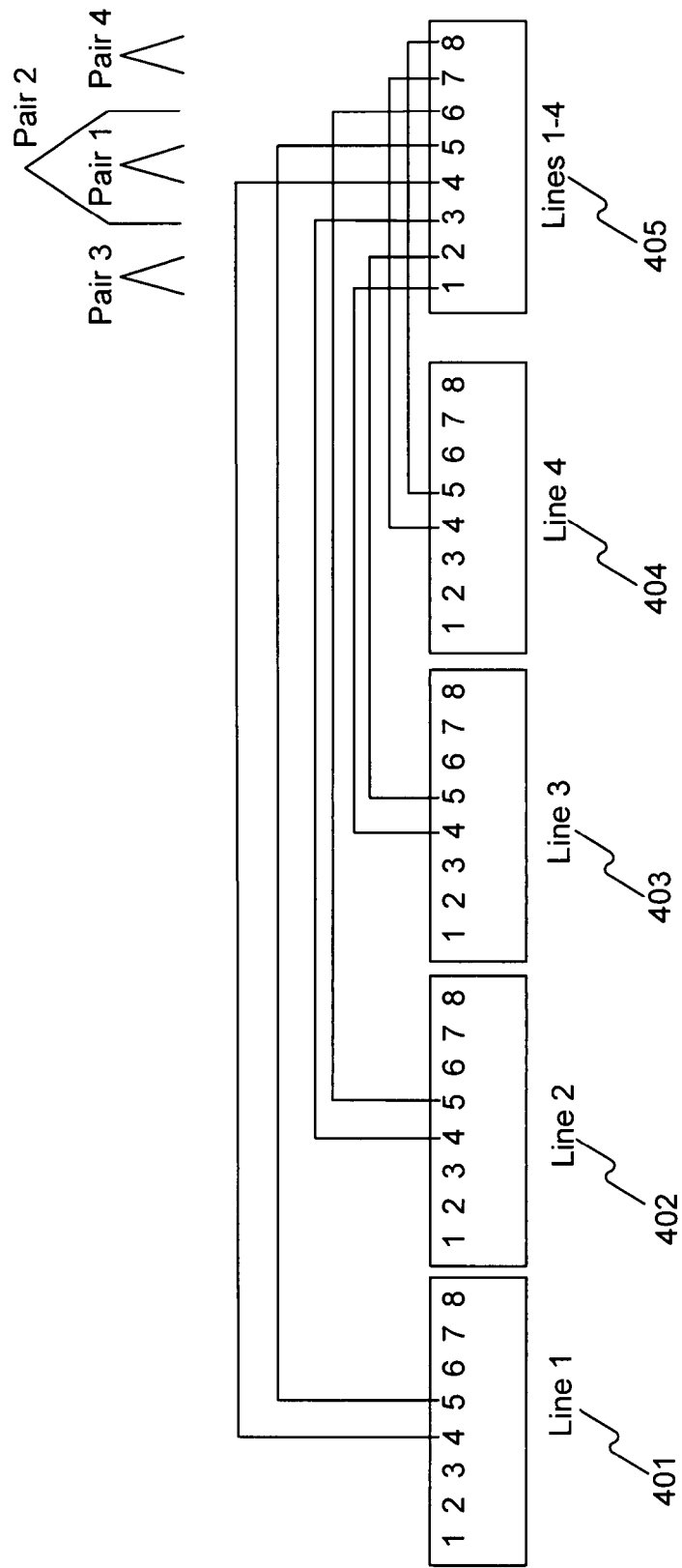
FIG. 5B is a schematic diagram of line parings between interface input jacks and interface output jacks.

FIG. 5B is an electrical schematic view of the interface 400. Each of jacks 401-405 may include eight terminals labeled 1-8. The actively used terminals of jacks 401-405 are indicated with vertical lines extending upwardly therefrom. In this example, routing conductors electrically connect interface input terminals with interface output terminals using pairs of routing conductors at each interface input terminal. Each interface input routing conductor pair is routed to a corresponding pair of interface output routing conductors at interface output terminals following a predetermined pattern. One possible routing pattern is shown following an exemplary 568A pattern at interface output jack 405. Each active terminal at positions 4 and 5 of respective interface input jacks 401-404 is routed to a respective separate terminal on interface output jack 405. Line 1 of interface input jack 401 is routed as PAIR 1 to interface output terminals 4 and 5. Line 2 of interface input jack 402 is routed as PAIR 2 to interface output terminals 3 and 6. Line 3 of interface input jack 403 is routed as PAIR 3 to interface output terminals 1 and 2. Line 4 of interface input jack 404 is routed as PAIR 4 to interface output terminals 7 and 8.

Figure 6:
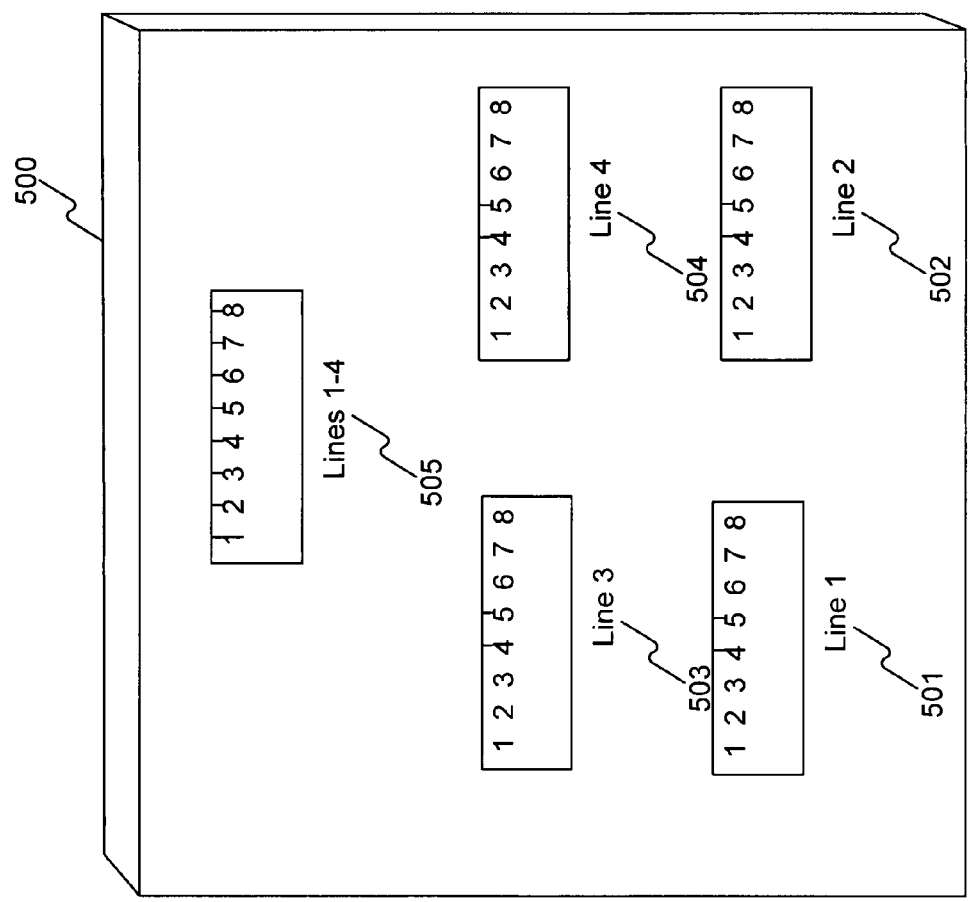
FIG. 6 is an alternative embodiment showing a schematic of an interface arranged with a matrix-like pattern of interface input jacks.

FIG. 6 shows a schematic of an alternative embodiment, using an interface 500 having a matrix-like pattern of interface input jacks 501, 502, 503, and 504. Interface output jack 505 is distinguished in position from interface input jacks 501-504. Other arrangements and configurations of input jacks and output jacks may be contemplated to accommodate different sizes or shapes of connectors, or to accommodate space, mounting, or stability requirements near unit distribution panel 204.

Other cable types, with different numbers of wires, wire connectors, wire pairings, and corresponding interface changes are contemplated. Likewise, though only four interface input jacks 401-404 have been shown, other numbers of interface input jacks can be used with a corresponding change at the interface output jack 405. Other numbers of interface input terminals can also be actively used, with a corresponding change in routing conductors to route signals from the interface input jacks to an interface output jack, and with a corresponding change in the number of terminals on the interface output jack 405.

Interface 400 may also have more than one interface output jack to correspond to a larger number of unit distribution jacks 308 on unit distribution panel 204. This multi-output interface would have a corresponding multiplicity of interface input jacks organized to optimize wire usage on each cable of unit distribution wiring 205. Unit distribution wiring 205 may also comprise more than one cable, and more than one type of cable, with a corresponding change in the number and type of unit distribution jack 308. In this embodiment, either a multi-output interface would be needed, or multiple interfaces would be needed, each with corresponding interface output jacks 405.

Though one MDU building has been shown and described, a high-rise or a sprawling MDU building, stand-alone dwelling, town home or other structure can also benefit from the interface described herein. Though living units have been shown and described, the interface can also be used in business settings.

Internal distribution panels have been shown and described, but the interface 400 can be used with entrance facilities, telecommunication rooms, communication nodes, closets or hotels, and the interface can be used at distribution panel 202. Other types of distribution panels 202 and 204 are also contemplated, including distribution panels that do not have service provider terminations or jacks 306. In this alternative, a service provider routes building distribution wiring to a living unit 212 and connects to interface 400, which is connected to a unit distribution jack 308. Alternatively, a service provider routes cables 201 to a building 200 and connects to interface 400, which is connected to a building distribution jack on a distribution panel 202.

The interface 400 can also connect to a spliced cable of unit distribution wiring 205. In this alternative, individual wires of unit distribution wiring 205 are connected to an appropriate stand-alone or modular connector, such as a Cat-5 cable connection to an RJ-45 jack or plug. The interface 400 then connects via interface output connector 405 and cable output connector 312 to the stand-alone or modular connector jack to allow service provider access the individual wires of unit distribution wiring 205. When the stand-alone or modular connector is a plug, the unit distribution wiring 205 may plug directly into interface output connector 405.

As an alternative to using cable input connectors 311*a*-311*d* to connect to interface input connectors 401-404, a service provider could by-pass the use of cable input connectors 311*a*-311*d* by plugging directly in to an interface input connector 401-404 with an appropriate service provider wiring input connector electrically connected service provider wiring.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A communication cable interface, comprising:
   a plurality of interface input connectors configured to receive corresponding ones of a plurality of cable input connectors, the cable input connectors having corresponding terminals and being associated with input cables in communication with a distribution box disposed at a location of a customer, and the interface input connectors comprising a plurality of input terminals located in specified connector positions for exchanging signals with terminals of the corresponding cable input connectors;
   an interface output connector configured to receive a cable output connector of an associated output cable in communication with the distribution box, the interface output connector comprising a plurality of output terminals located in specified connector positions for exchanging signals with corresponding terminals of the received cable output connector; and
   a plurality of routing conductors electrically connecting the input terminals to the output terminals,
   wherein input terminals in identical connector positions of at least some of the interface input connectors are connected to different interface output connector terminals.

2. The interface of claim 1, wherein the routing conductors comprise discrete wires.

3. The interface of claim 1, wherein the routing conductors comprise printed circuit wiring.

4. The interface of claim 1, wherein the routing conductors comprise pairs of conductors connecting to pairs of input terminals and pairs of output terminals.

5. The interface of claim 1, wherein the input connectors are configured to receive more than one type of cable input connector.

6. The interface of claim 1, wherein at least one of the cable input connectors or the interface input connectors comprise a RJ-45 type connector.

7. The interface of claim 1, wherein the cable input connectors and the interface input connectors comprise at least one of a RJ-45 connector and RJ-11 connector.

8. The interface of claim 1, wherein the signals comprise one of at least voice, video, or data.

9. The interface of claim 1, comprising four interface input connectors, each interface input connector comprising eight input terminals; one interface output connector comprising eight output terminals; a pair of routing conductors for each of the four interface input connectors, the routing conductors, electrically connecting a pair of input terminals to a pair of output terminals in the interface output connector.

10. The interface of claim 9, wherein the routing conductors route signals from each pair of routing conductors at each input terminal to the eight output terminals so that each input terminal has a corresponding output terminal.

11. The interface of claim 10, wherein the routing conductors route signals following a predetermined pattern.

12. The interface of claim 11, wherein the predetermined pattern arranges the signals from the pairs of input terminals on the output terminals in an industry-standard pattern selected from USOC, 568A, or 568B.

13. A system for connecting service provider signals to customer devices, comprising:
   service provider wiring for transmitting service provider signals from at least one service provider to a distribution box disposed at a customer location; and
   an interface in communication with the distribution box, the interface comprising:
      a plurality of interface input connectors configured to receive corresponding ones of a plurality of wiring input connectors associated with the service provider wiring, the interface input connectors comprising a plurality of input terminals located in specified connector positions for exchanging signals with corresponding terminals of the service provider wiring input connectors;
      an interface output connector configured to receive a wiring output connector of an associated unit distribution wiring, the interface output connector comprising a plurality of output terminals located in specified connector positions for exchanging signals with corresponding terminals of the received wiring output connector, and the unit distribution wiring being in communication with the customer devices through the distribution box; and a plurality of routing conductors electrically connecting the input terminals to the output terminals;

wherein input terminals in identical connector positions of at least some of the interface input connectors are connected to different interface output connector terminals.

14. The system of claim 13, wherein the unit distribution wiring transmits service provider signals to service outlets in a customer unit.

15. The system of claim 13, wherein the unit distribution wiring comprises a plurality of cables with associated wiring output connectors and output terminals.

16. The system of claim 14, further comprising additional interface output connectors configured to receive the plurality of wiring output connectors of associated unit distribution wiring, the interface output connectors comprising a plurality of output terminals located in specified connector positions for exchanging signals with corresponding terminals of the received wiring output connector.

17. The system of claim 15, wherein the plurality of cables on unit distribution wires comprises more than one type of cable.

18. A system for connecting service provider signals to customer devices comprising:

service provider wiring for transmitting service provider signals from the service provider to a distribution box disposed at a customer location; and an interface in communication with the distribution box, the interface comprising:

a plurality of interface input connectors configured to receive corresponding ones of a plurality of wiring input connectors associated with the service provider wiring, the interface input connectors comprising a plurality of input terminals located in specified connector positions for exchanging signals with corresponding terminals of the service provider wiring input connectors;

an interface output connector configured to receive a cable output connector of an associated output cable in communication with the distribution box, the interface output connector comprising a plurality of output terminals located in specified connector positions for exchanging signals with corresponding terminals of the cable output connector; and a plurality of routing conductors electrically connecting the input terminals to the output terminals, wherein input terminals in identical connector positions of at least some of the interface input connectors are connected to different interface output connector terminals.

19. The system of claim 18 further comprising:

unit distribution wiring for transmitting service provider signals to service outlets in a customer unit; and a unit distribution wiring connector attached to the unit distribution wiring to electrically connect unit distribution wiring connector terminals in the unit distribution wiring connector to wires of the unit distribution wiring, wherein the output cable comprises an additional connector configured to exchange signals with the unit distribution wiring connector.

20. A system for connecting service provider signals to customer devices comprising:

distribution wiring for transmitting service provider signals from service provider cables to a customer location;

a distribution panel comprising:

a service provider termination connected to the distribution wiring and configured to exchange the service provider signals on the distribution wiring with service provider terminals on a service provider jack; and a unit distribution termination connected to unit distribution wiring and configured to exchange the service provider signals with unit distribution terminals on a unit distribution jack; and an interface coupled to the distribution panel, the interface comprising:

a plurality of interface input connectors configured to receive corresponding ones of a plurality of cable input connectors, the cable input connectors having corresponding terminals and being associated with input cables in communication with the distribution panel, and the interface input connectors comprising a plurality of interface input terminals located in specified connector positions for exchanging signals with terminals of the corresponding cable input connectors;

an interface output connector configured to receive a cable output connector of an associated output cable in communication with the distribution panel, the interface output connector comprising a plurality of interface output terminals located in specified connector positions for exchanging signals with corresponding terminals of the cable output connector; and a plurality of routing conductors electrically connecting the interface input terminals to the interface output terminals, wherein:

input terminals in identical connector positions of at least some of the interface input connectors are connected to different interface output connector terminals;

the input cables each have an opposite end with an additional connector configured to exchange signals with service provider terminals on the service provider jack; and the output cable has a second output connector at an opposite end of the cable for exchanging service provider signals with unit distribution terminals on the unit distribution jack.

* * * * *